(12) United States Patent  
Chu

(10) Patent No.: US 9,104,488 B2  
(45) Date of Patent: Aug. 11, 2015

(54) SUPPORT SERVER FOR REDIRECTING TASK RESULTS TO A WAKE-UP SERVER

(71) Applicant: ALCATEL-LUCENT, Paris (FR)

(72) Inventor: Thomas P. Chu, Englishtown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/069,746

(22) Filed: Nov. 1, 2013

(65) Prior Publication Data

US 2014/0059152 A1 Feb. 27, 2014

Related U.S. Application Data

(62) Division of application No. 13/217,781, filed on Aug. 25, 2011, now Pat. No. 8,606,908.

(51) Int. Cl.
| | | |
|---|---|---|
| G06F 15/173 | (2006.01) | |
| G06F 9/50 | (2006.01) | |
| H04L 12/22 | (2006.01) | |
| H04L 29/08 | (2006.01) | |
| G06F 15/16 | (2006.01) | |

(52) U.S. Cl.  
CPC ............ *G06F 9/5027* (2013.01); *G06F 9/5022* (2013.01); *G06F 9/5072* (2013.01); *H04L 12/22* (2013.01); *H04L 29/08153* (2013.01)

(58) Field of Classification Search  
CPC . H04L 12/22; H04L 29/08153; G06F 9/5017; G06F 9/5022  
See application file for complete search history.

(56) References Cited

U.S. PATENT DOCUMENTS

| 5,983,353 | A  * | 11/1999 | McHann, Jr. ................. 713/310 |
| 6,823,382 | B2 * | 11/2004 | Stone ............................ 709/224 |
| 8,612,562 | B2 * | 12/2013 | Sugawara ..................... 709/223 |
| 2011/0026704 | A1 * | 2/2011 | Connelly et al. .............. 379/219 |

* cited by examiner

*Primary Examiner* — Wen-Tai Lin  
(74) *Attorney, Agent, or Firm* — Kramer & Amado, P.C.

(57) ABSTRACT

Various exemplary embodiments relate to a method and related network node including one or more of the following: receiving, at a wake-up server, an indication that an agent device will be suspended, including at least one criterion for reestablishing the agent device; determining that the at least one criterion has been met; and, in response, reestablishing the agent device. Various exemplary embodiments relate to a method and related network node including one or more of the following: transmitting, by an agent device to a support server, a request message; transmitting, to a wake-up server, an indication that resources associated with the agent device will be released, including at least one criterion for reestablishing the agent device; transmitting, to the support server, an instruction to transmit a result message associated with the request message to the wake-up device; and releasing the system resources associated with the agent device.

17 Claims, 8 Drawing Sheets

| | 705 | 710 | 715 | 720 | 725 |
|---|---|---|---|---|---|
| | Schedule ID | Timeout Timestamp | Support Servers | Wake-Up Criteria | Device Image Location |
| 730 | 0x1578 | 1309780844 | {81.11.51.79} | Results from All Support Servers | 0x9d05816a1a... |
| 735 | 0x63E2 | 1309783287 | {24.82.226.24; 210.116.68.176} | Results from Support Server #2 | 0x0ce34aa7be... |
| 740 | 0xF5D1 | 1309786071 | {24.82.226.24; 132.64.178.68; 182.74.152.238} | Results from at least Two Support Servers | 0x00a69043b5... |
| 745 | 0xC82F | 1309788977 | {132.64.178.68; 178.217.216.124; 176.128.143.247} | Successful results from at least One Support Server | 0xf57d1e4b0a... |
| 750 | ... | ... | ... | ... | ... |

700

| Task ID | Request | Results Recipient | Schedule ID |
|---|---|---|---|
| 0x0A | Query DB: "Select * Where ..." | 42.26.209.65 | |
| 0x32 | Perform Function: "analyzeDataSample(var ..." | 50.32.230.130 | 0x63E2 |
| ... | ... | ... | ... | ized, and the step of determining that the at least one criterion has been met comprises determining that a current time is after the timeout value.

SUPPORT SERVER FOR REDIRECTING TASK RESULTS TO A WAKE-UP SERVER

CROSS-REFERENCE TO RELATED APPLICATIONS

This application is a division of U.S. application Ser. No. 13/217,781, filed on Aug. 25, 2011, the entire disclosure of which is hereby incorporated herein for all purposes.

TECHNICAL FIELD

Various exemplary embodiments disclosed herein relate generally to system resource management.

BACKGROUND

With the emergence of new modular processing architectures for data centers, a new way of data processing is possible for both enterprises and consumers. A number of companies have set up data centers throughout the US as well as globally. An enterprise or individual consumer can subscribe to their services and can access their services through the Internet. When accessing these services, a subscriber can create virtual machines (VMs), request storage space, load applications from the virtual storage to the VM and activate the applications, etc. on an as-needed basis.

With this way of computing, users may off-load processing from their machines and use the services provided by the computing service providers. This form of the processing is commonly referred to as "cloud computing," as the data processing is virtualized and resides in the Internet "cloud". An example of cloud computing service provider is the EC2 service from Amazon.

Currently, VMs are charged by the hour by the clouding computing service provider. The size of the VM (in terms of computing power) would determine the rate. For some computing service providers, the basic service subscription comes with a number of "free" hours. Time used after that may be charged by the hour.

SUMMARY

Various exemplary embodiments relate to a method performed by a wake-up server for reestablishing an agent device, the method including one or more of the following: receiving, at the wake-up server, an indication that an agent device will be suspended, the indication including at least one criterion for reestablishing the agent device; determining that the at least one criterion has been met; and in response to determining that the at least one criterion has been met, reestablishing the agent device.

Various embodiments are described wherein the at least one criterion specifies that at least one result message should be received from at least one support server, and wherein the method further includes one or more of the following: receiving, at the wake-up server, at least one result message from the at least one support server, wherein the step of determining that the at least one criterion has been met is performed in response to receiving the at least one result message.

Various embodiments additionally include transmitting the at least one result message to the agent device.

Various embodiments additionally include comprising authenticating the at least one result message.

Various embodiments are described wherein the at least one criterion is an indication of a timeout value, wherein the timeout value is a time after which the agent device should be re-initial- Various embodiments are described wherein the step of reestablishing the agent device includes one or more of the following: allocating system resources for use by the agent device; and configuring the system resources to store information specified by a device image.

Various embodiments additionally include comprising locating the device image based on information carried by the indication.

Various embodiments are described wherein the agent device and wake-up server each include at least one processor that belongs to a cloud computing architecture.

Various exemplary embodiments relate to method performed by an agent device for releasing system resources, the method including one or more of the following: transmitting, by the agent device to a support server, a request message; transmitting, by the agent device to a wake-up server, an indication that resources associated with the agent device will be released, wherein the indication includes at least one criterion for reestablishing the agent device; transmitting, by the agent device to the support server, an instruction to transmit a result message associated with the request message to the wake-up device; and releasing the system resources associated with the agent device.

Various embodiments additionally include one or more of the following: generating a device image based on information stored by the system resources; and storing the device image at a location accessible by the wake-up server.

Various embodiments are described wherein the at least one criterion specifies that the wake-up server should receive the result message from the support server.

Various embodiments are described wherein the at least one criterion specifies that the wake-up server should receive result messages from two or more support servers.

Various embodiments are described wherein the at least one criterion specifies a time after which resources should be reallocated for the agent device.

Various embodiments additionally include, after system resources have been reallocated for the agent device, receiving the result message by the agent device from the wake-up server.

Various exemplary embodiments relate to method performed by a support server for redirecting results, the method including one or more of the following: receiving, by the support server from an agent device, a request message; receiving, by the support server from an agent device, an instruction to transmit a result message associated with the request message to a wake-up server; processing the request message to generate result data; generating a result message based on the result data; and transmitting the result data to the wake-up server.

Various embodiments are described wherein the result message includes at least a portion of the result data.

Various embodiments are described wherein the request message includes a request for at least one of the performance of a database query and the performance of a processing task.

Various embodiments are described wherein at least two of the support server, the wake-up server, and the agent device include at least one processor that belongs to a cloud computing architecture.

Various embodiments are described wherein the instruction and the result message include a set of authentication information.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
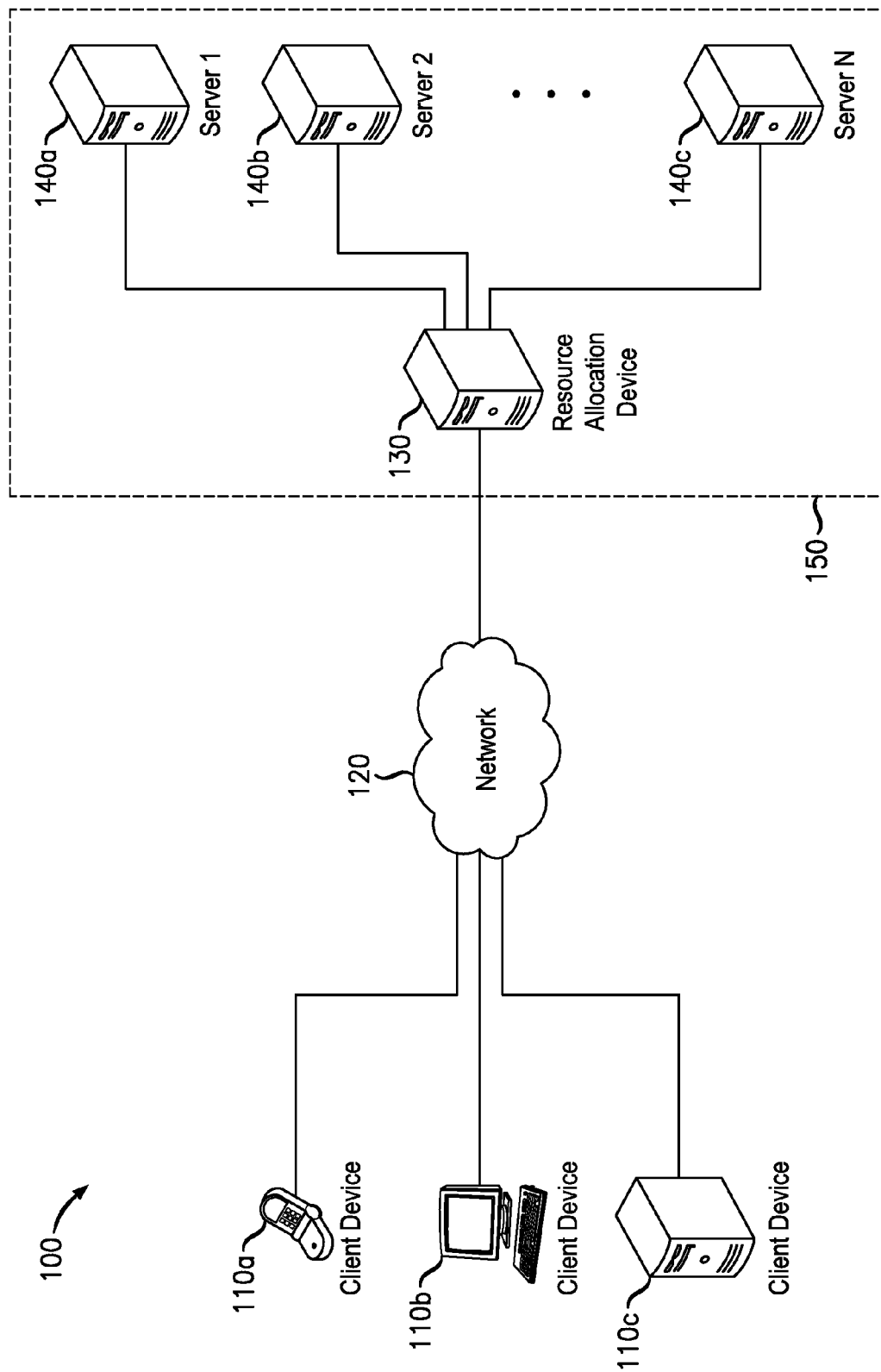
FIG. 1 illustrates an exemplary system for providing processing resources.

During the execution of an application, the application may need to invoke special programs or retrieve data from a third party. For example, the application may request some complex computation from a special program from an external organization. The application may be unable to proceed until the results for these external requests are returned. If the application is the only application running at an agent device, it may not be cost effective for the user to maintain the application in the machine while waiting for these results. For example, usage of the machine may be charged per hour or per another time limit, regardless of actual activity.

In view of the foregoing, there exists a need for a system and method for freeing system resources when an application may be otherwise idle. There exists a further need for reallocating such resources once the application may resume processing.

Referring now to the drawings, there are disclosed broad aspects of various exemplary embodiments.

FIG. 1 illustrates an exemplary system 100 for providing processing resources. Exemplary system may include a number of client devices 110a-c, a network 120, a resource allocation device 130, and a number of servers 140a-c. As shown by dotted box 150, resource allocation device 130 and server 140a-c may reside together in a cloud computing infrastructure.

Client devices 110a-c may each include any device capable of communicating with a network such as network 120. While three devices are illustrated here, exemplary system 100 may include fewer or more devices. Further, the number of client devices participating in exemplary system 100 may change during operation. For example, client device 110a may cease participating in exemplary system 100 and/or another two client devices (not shown) may commence similar participation.

Each client device 110a-c may be a personal or laptop computer, terminal, server, tablet, wireless email device, cell phone, smart phone, television set-top box, or any other device capable of communicating with other devices via network 120. Each client device 110a-c may participate in exemplary system 100 for different reasons. For example, client device 110a may be a thin client and may rely on other resources within exemplary system to perform most or all processing related to the normal operation of client device 110a. As another example, client device 110b may be a personal computer capable of independently performing most tasks and may rely on other resources within exemplary system 100 to store and retrieve data such as, for example, a large music or ebook collection. As yet another example, client device 110c may be a server that receives and responds to requests from other devices (not shown). Client device 110c may rely on other resources within exemplary system 100 to process a portion of such requests when the rate at which such requests arrive is too high for client device 110c to process within some measure of efficiency, response time, or other metric for gauging server load.

Network 120 may be may be a device or group of devices adapted to provide communication between other devices of exemplary system 100. Accordingly, network 120 may include a number of routers and/or switches for forwarding packets to appropriate destinations. In various embodiments, network 120 may include one or more 2G, 3G, and/or 4G systems. Further, in various embodiments, network 120 may include the Internet.

Resource allocation device 130 may be a device that manages, and routes various requests and other traffic between client devices 110a-c and servers 140a-c. Resource allocation device may receive a message from a client device 110a-c and forward the message to one or more of servers 140a-c. Resource allocation device may select one or more servers 140a-c to process the message based on various factors such as, for example, which servers 140a-c currently have unused resources and/or which servers 140a-c have previously handled other messages from the client device 110a-c. Conversely, when a server 140a-c transmits a message to one of client devices 110a-c, resource allocation device 130 may forward the message in a similar manner. Alternatively, servers 140a-c may transmit such messages directly to the appropriate client device 110a-c. It should be noted that exemplary system 100 may include more than one resource allocation device 130. Resource allocation device 130 may be an independent physical device and/or may include one or more processors from servers 140a-c. Resource allocation device may perform numerous additional functions such as, for example, resource reservation, load balancing, usage metering, charging.

Servers 140a-c may each include resources for use by client devices such as client devices 110a-c. It should be noted that, similar to client devices 110a-c, exemplary system 100 may include any number of servers 140a-c and the number of servers 140a-c may vary over time. Each server 140a-c may include at least one processor, memory, storage device or network interface. As such, servers 140a-c may execute applications, store data, and/or communicate with other devices on behalf of client devices 110a-c. Each server 140a-c may provide resources to multiple client devices 110a-c. For example, a processor of server 1 140a may execute applications associated with both client device 110a and client device 110b.

In various embodiments, multiple servers 140a-c may also provide resources to a single client device. For example, a single multi-threaded application requested by client device 110a may be executed by a processor on server 1 140a and a processor on server 2 140b and may utilize a memory of server N 140*c*. From the point of view of client device 110*a*, however, the single multi-threaded application may appear to execute on a single agent device. Such agent device may include only those resources among servers 140*a-c* committed to client device 110*a*. As client device 110*a* requests more or less resources, the characteristics of this agent device may vary accordingly. For example, if the multi-threaded application of the previous example were to terminate, leaving only a single application executing on the processor of server 1 140*a*, the agent device may release the previously committed processing time of the processor on server 2 140*b*.

Figure 2:
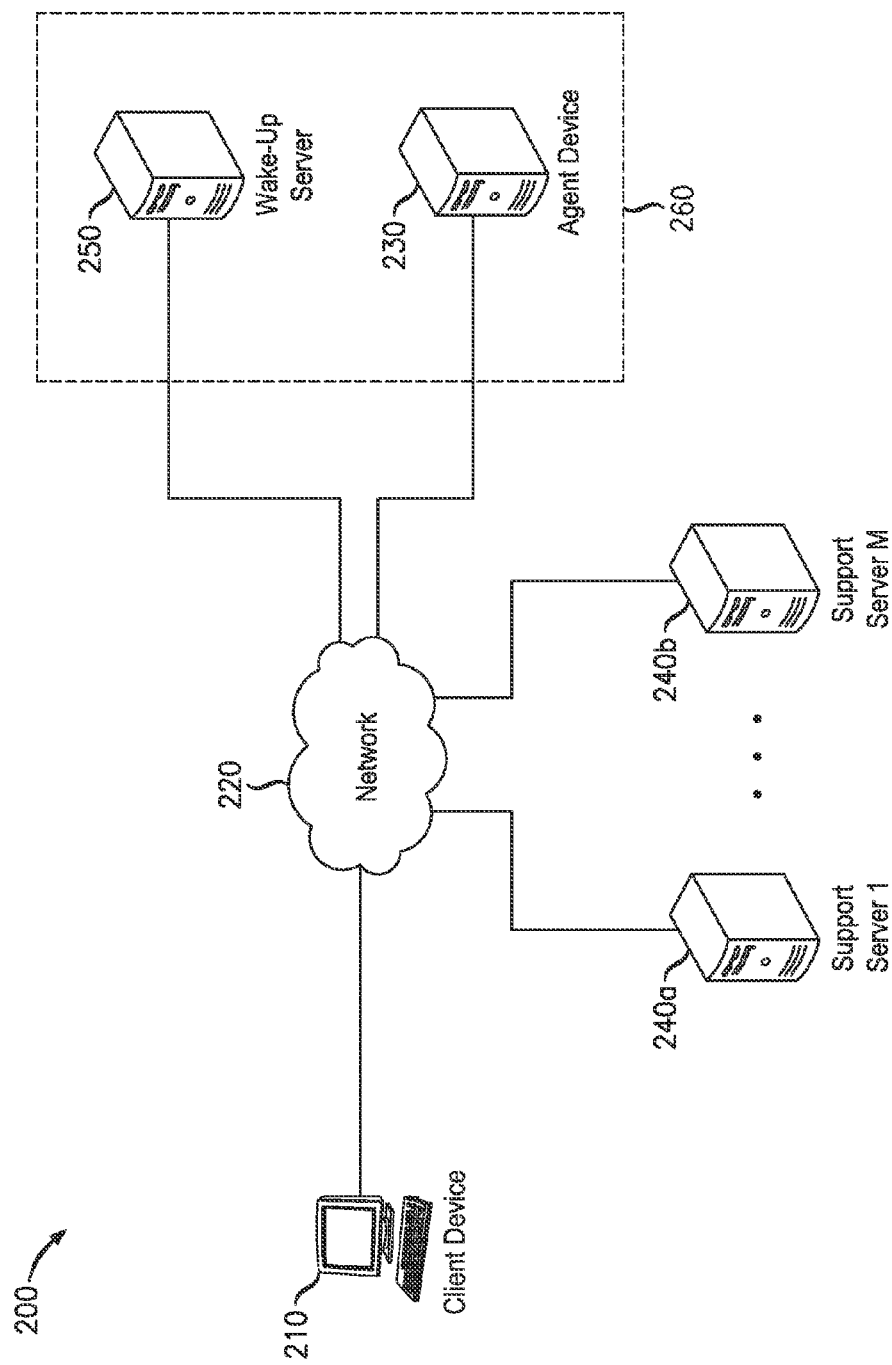
FIG. 2 illustrates an exemplary system for suspending and reestablishing an agent device.

FIG. 2 illustrates an exemplary system 200 for suspending and reestablishing an agent device. Exemplary system 200 may include a client device 210, network 220, agent device 230, and support servers 240*a-b*, wake-up server 250. Exemplary system 200 may be similar to exemplary system 100. In various embodiments, exemplary system 200 may be the same as exemplary system 100, instead presenting a different view of the system. For example, agent device 230 may be the same device as one or more of servers 140*a-c* and/or portions thereof. As shown by dotted box 260, resource agent device 230 and wake-up server 250 may reside together in a cloud computing infrastructure.

Client device 210 may be similar to one of client devices 110*a-c* of exemplary system 100. Accordingly, client device 210 may be a personal or laptop computer, terminal, server, tablet, wireless email device, cell phone, smart phone, television set-top box, or any other device capable of communicating with other devices via network 220. Client device 210 may be associated with and communicate with agent device 230, as will be described in greater detail below.

Network 220 may be similar to network 120 of exemplary system 100. Accordingly, network 220 may be may be a device or group of devices adapted to provide communication between other devices of exemplary system 200. Accordingly, network 220 may include a number of routers and/or switches for forwarding packets to appropriate destinations. In various embodiments, network 220 may include one or more 2G, 3G, and/or 4G systems. Further, in various embodiments, network 220 may include the Internet.

Agent device 230 may be a collection of hardware resources currently committed to a client device such as, for example, client device 210. As such, agent device 230 may include system resources from one or more servers such as servers 140*a-c* of exemplary system 100. Agent device 230 may perform various functions on behalf of client device 210 such as, for example, program and/or thread execution, data storage and/or retrieval, and/or communication with other devices such as support servers 240*a-b*. The hardware associated with agent device 230 may vary over time as client device 210 utilizes more or less resources. Further, a management device, such as resource allocation device 130 of exemplary system 100, may periodically swap hardware associated with agent device 230 in an effort to efficiently utilize all available resources.

In various embodiments and under various circumstances, agent device may rely on support servers 240*a-b* to respond to various requests. For example, agent device 230 may request processing of a task by support server 1 240*a* or execution of a database query by support server M 240*b*. In various embodiments, an agent device 230 may be unable to proceed with other processing until one or more responses are received from support servers 240*a-b*. During such time, agent device 230 may simply remain idle while a user is charged for lease of the resources. Alternatively, agent device 230 may release a least a portion of its hardware resources during this time, thereby reducing a cost to the user.

Support servers 240*a-b* may each include hardware and/or software configured to process various requests from other devices. For example, each support server 240*a-b* may be a web server, database server, or other similar device. As such, support servers 240*a-b* may each include various hardware components for effecting such functions as, for example, processors, memory, storage devices, and/or network interfaces. In various embodiments, support servers 240*a-b* may be remote from client device 210, agent device 230, wake-up server 250, and/or each other. In various embodiments, one or more of support servers 240*a-b* may share one or more hardware elements with wake-up server 250 and/or agent device 230. For example, support server 1 240*a* may share a processor with wake-up server 250. Support servers 240*a-b* may be third party servers and/or may be administered by the same organization or individual that owns the client device 210. Support servers may include additional agent devices operating within a cloud computing environment.

Wake-up server 250 may be a device adapted to re-establish agent devices such as agent device 230 upon meeting some specified criteria, as will be explained in greater detail below. Wake-up server 250 may include various hardware such as, for example, processors, memory, storage devices, and/or network interfaces. Such hardware may be resident among a plurality of servers such as, for example, servers 140*a-c* of exemplary network 100. In various embodiments, wake-up server 250 may share one or more hardware devices with agent device 230, support servers 240*a-b*, and/or other devices (not shown).

As detailed above, in various embodiments, agent device 230 may remain idle at times while waiting on responses from other servers such as support servers 240*a-b*. During this time, a user may be charged for the committed resources even though the resources are not being used. In an effort to free such resources and avoid unnecessary costs, agent device 230 may be suspended while waiting on a response from such other servers. In suspending agent device 230, the state of the agent device, such as the contents of memory, may be stored as a device image for later retrieval. The resources associated with the agent device 230 may then be released such that they may be used for other purposes such as, for example, as part of other agent devices. Thereafter, wake-up server 250 may, when appropriate, reinitialize agent device 230 by committing hardware resources to the agent device 230 and configuring the resources to load the previously created device image, thereby picking up where the agent device 230 left off.

Figure 3:
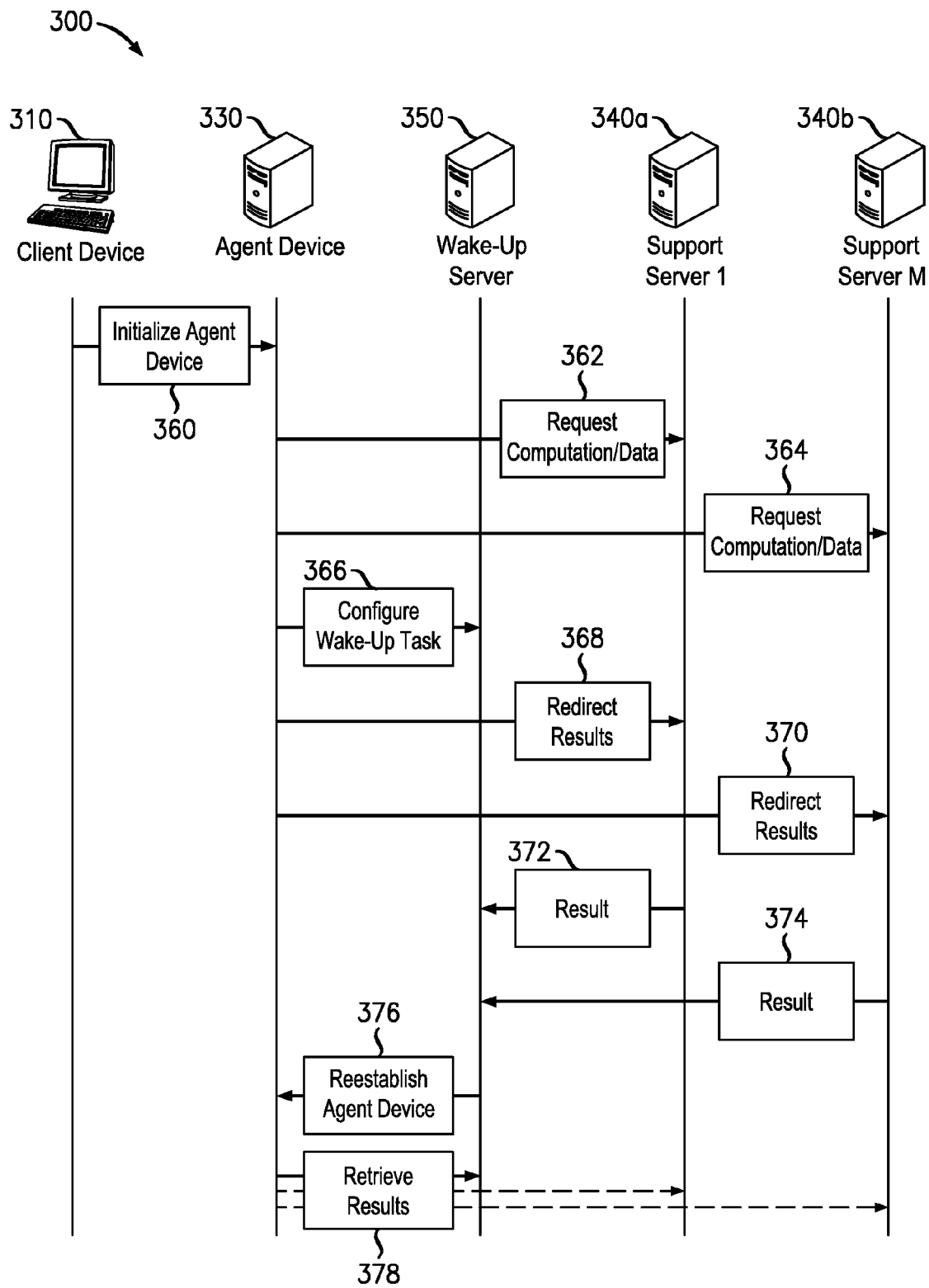
FIG. 3 illustrates an exemplary message exchange for suspending and reestablishing an agent device.

FIG. 3 illustrates an exemplary message exchange 300 for suspending and reestablishing an agent device. Exemplary message exchange may include a plurality of messages sent by and/or sent to client device 310, agent device 330, support server 1 340*a*, support server M 340*b*, and wake-up server 350. It should be noted that exemplary message exchange 300 is intended to illustrate the operation of a system such as exemplary systems 100 and/or 200, and that numerous alternative message exchanges may occur during operation.

Message exchange 300 may begin by client device 310 transmitting a message 360 requesting that an agent device be initialized on behalf of client device 310. Agent device 330 may then be initialized by committing hardware resources to the client device 310. Client device 330 may further communicate (not shown) with agent device 330 for example to configure its operation and/or receive the result of such operation. At some point, agent device 330 may send a request 362 to support server 1 340*a*. For example, agent device 330 may request that support server 1 340*a* perform some computation or retrieve data from a database. Likewise, agent device may send a similar or different request 364 to support server M 340*b*.

At this point, agent device 330 may determine that no additional processing may occur until at least one of the support servers 340*a-b* sends a response message. Accordingly, agent device 330 may determine that agent device 330 should suspend operation until such time. To assure that agent device 330 will be reestablished when such response messages arrive, agent device may first construct and transmit a message 366 to wake-up server 350 indicating when the agent device 330 should be reestablished. Message 366 may include numerous fields indicating information useful for identifying the agent device and/or messages associated therewith such as, for example, the identity of the agent device 330, the identity of a user that owns the agent device 330, an IP address for each support server 340*a-b*, an identity of each support server 340*a-b*, a transaction identifier for each support server 340*a-b*, authentication information for each support server 340*a-b*. In various embodiments, message 366 may additionally or alternatively include fields indicating information useful in determining when and how to reestablish an agent device such as, for example, a time stamp indicating the time period over which authentication information is valid, criteria for determining when an agent device should be reestablished (as will be explained in greater detail below), characteristics of the agent device 330 such as operating system and processing power, and/or an indication of where a device image will be stored for the agent device 330. It should be apparent that the above-detailed information is an exemplary list and that various alternative sets of information may be provided in accordance with the methods described herein.

Using the provided information, wake-up server 330 may schedule a wake-up task for reestablishing the agent device 330 at a time in the future as determined by the provided criteria. Such criteria may include an indication of which and/or how many sets of results should be received from support servers 340*a-b* before agent device 330 should be reestablished. Additionally or alternatively, such criteria may include a timestamp indicating a time after which the agent device 330 should be reestablished, regardless of whether any results have been received from support servers 340*a-b*.

Next, agent device 330 may transmit a message 368 to support server 1 340*a* indicating that the response for the previous request should be sent to wake-up server 350 instead of agent device 330. This message 368 may include various information such as, for example, an identifier that indicates the message is requesting that results be directed to a different device, an identity of wake-up server 350, an IP address of wake-up server 350, an identifier of a wake-up schedule entry at the wake-up server 350, and/or authentication information. Agent device 330 may transmit a similar message 370 to support server M 340*b*.

At this point, agent device 330 may generate and store a device image at a location known to the wake-up server. For example, agent device 330 may store the device image at a location identified in message 366 to wake-up server 350. After storing the device image, agent device 330 may suspend itself by releasing some or all of its associated hardware resources such that the hardware resources may be used by other entities.

Once support servers 340*a-b* complete their respective requested tasks, support servers may each send a result message 372, 374 to wake-up server 350, as requested by agent device 330. Such result messages 372, 374 may include all of the result data associated with the task. Alternatively, the result message may include only a portion of such data or no portion of such data, and further indicate that the remainder of the data may be obtained by downloading such data from the appropriate support server 340*a-b*.

Upon receiving the two result messages 372, 374, wake-up server may determine that it is appropriate to reestablish 376 the agent device 330. Accordingly, wake-up server 350 may, either directly or by instructing another device (not shown) commit hardware resources to the agent device in accordance with the resources needed and/or leased by the user. Wake-up server 350 may also load the previously stored device image on the newly reestablished agent device 330, allowing the agent device 330 to restore its context from the time it was suspended. Thereafter, agent device 330 may retrieve 378 the result data from wake-up server 350 if the data was carried by result messages 372, 374 and/or directly (as shown by the dotted arrows) from support servers 340*a-b*. Agent device 330 may then continue operation in accordance with the received results.

Figure 4:
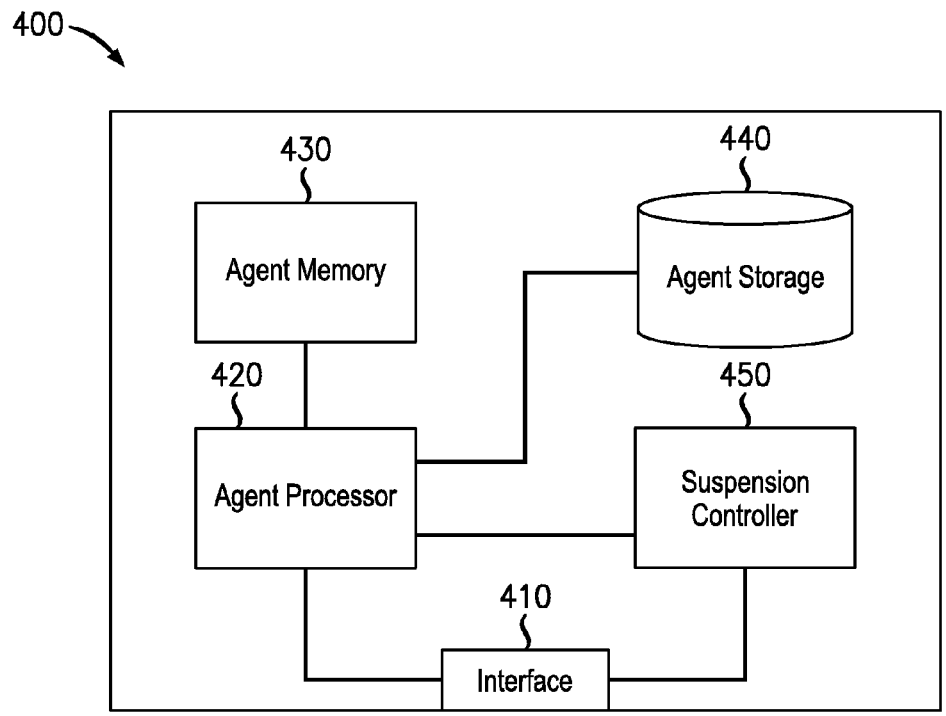
FIG. 4 illustrates an exemplary agent device.

FIG. 4 illustrates an exemplary agent device 400. Agent device 400 may correspond to agent device 230 and/or agent device 330. Agent device 400 may include an interface 410, agent processor 420, agent memory 430, agent storage 440, and/or suspension controller 450.

Interface 410 may be an interface comprising hardware and/or executable instructions encoded on a machine-readable storage medium configured to communicate with at least one other device. For example, interface 410 may communicate with a client device, wake-up server, and/or support servers. Accordingly, interface 410 may include one or more Ethernet interfaces for communication via a network such as the Internet. Further, interface 410 may include numerous interfaces having differing addresses, having differing protocols, and/or belonging to different physical servers. Further, agent device 400 may share interface 410 or portions thereof with other entities such as, for example, other agent devices.

Agent processor 420 may include one or more processors for executing stored instructions. Likewise, agent memory 430 may include one or more devices for functioning as a system memory while agent storage 440 may include one or more storage devices for storing data. In various embodiments, agent processor 420, agent memory 430, and/or agent storage 440 may include hardware belonging to different physical servers. Further, agent device 400 may share one or more of agent processor 420, agent memory 430, and/or agent storage 440, or portions thereof with other entities such as, for example, other agent devices.

Suspension controller 450 may include hardware and/or executable instructions on a machine-readable storage medium configured to suspend agent device 400 such that agent device 400 may be reestablished when appropriate. In various embodiments, suspension controller may share at least one processor with agent processor 420. Suspension controller 450 may be adapted to identify times at which agent processor 420 is idly waiting for results from support servers. Accordingly, suspension controller 450 may include an activity monitor. Suspension controller 450 may further have knowledge of when agent processor has requested results from one or more support server by, for example, monitoring messages sent by agent processor 420 via interface 410 or by directly receiving an indication from agent processor that such a request has been transmitted.

Figure 5:
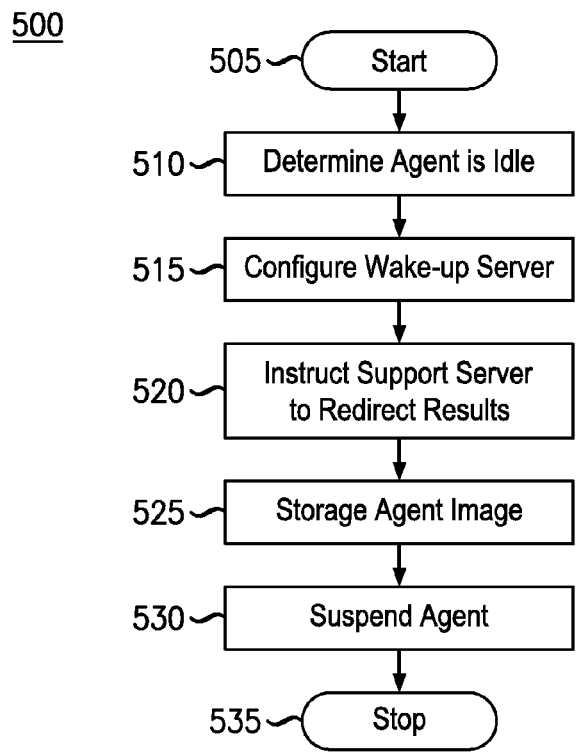
FIG. 5 illustrates an exemplary method for suspending an agent device.

FIG. 5 illustrates an exemplary method 500 for suspending an agent device. Method 500 may be performed by the components of agent device 400 such as, for example, suspension controller 450.

Method 500 may begin in step 505 and proceed to step 510 where suspension controller 450 may determine that agent processor 420 is currently idle while awaiting results from a support server. Next, in step 515, suspension controller 450 may proceed to construct and transmit a message to a wake-up server, as described above, indicating criteria for reestablishing agent device 400. Suspension controller 450 and/or agent processor 420 may determine appropriate criteria for reestablishing the agent device 400 according to any method known to those of skill in the art. Then, in step 520, suspension controller 450 may construct and transmit one or more messages to one or more support servers, as described above, indicating that results should be redirected to the wake-up server. After transmission of such messages, method 500 may proceed to step 525, where suspension controller 450 may generate a device image for the agent device and store it in a location accessible to the wake-up server. For example, suspension controller 450 may store the device image in a portion of agent storage 440 that will persist after agent device 400 has been suspended. Alternatively, suspension controller 450 may transmit the device image to another location for storage. Next, in step 530, suspension controller may suspend agent device 400 by, either directly or by instructing another device, releasing at least a portion of hardware resources associated with agent device, such that those resources may be used by other entities. Method 500 may then proceed to end in step 535.

Figures 6, 7:
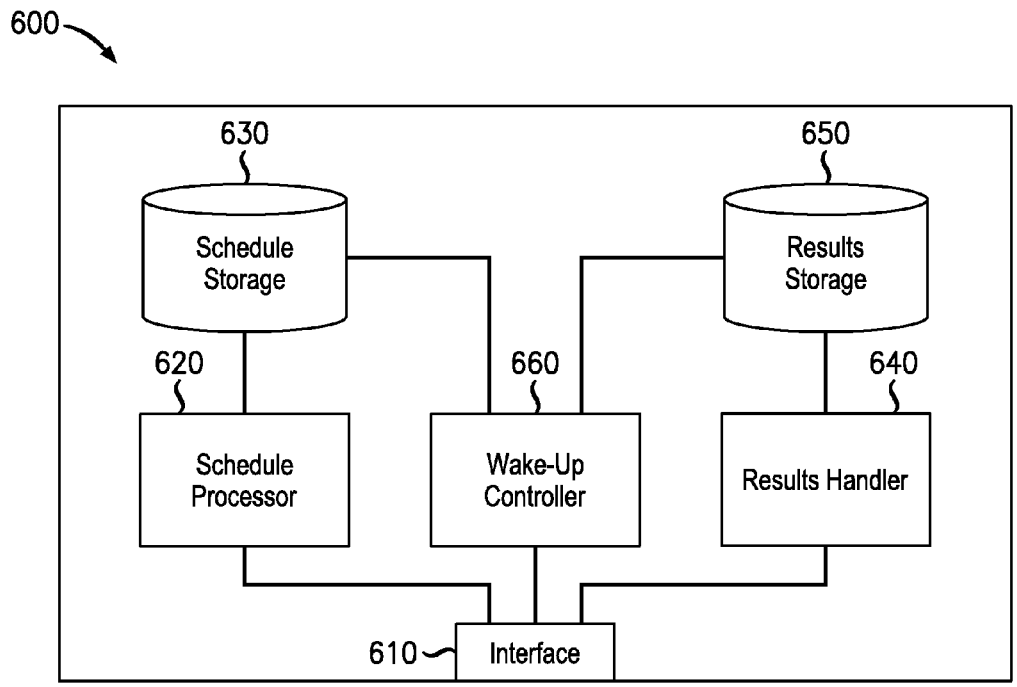
FIG. 6 illustrates an exemplary wake-up server.
FIG. 7 illustrates an exemplary wake-up schedule.

FIG. 6 illustrates an exemplary wake-up server 600. Wake-up server 600 may correspond to wake-up server 250 and/or wake-up server 350. Wake-up server may include interface 610, schedule processor 620, schedule storage 630, results handler 640, results storage 650, and/or wake-up controller 660.

Interface 610 may be an interface comprising hardware and/or executable instructions encoded on a machine-readable storage medium configured to communicate with at least one other device. For example, interface 610 may communicate with a client device, agent device, and/or support servers. Accordingly, interface 610 may include one or more Ethernet interfaces for communication via a network such as the Internet. Further, interface 610 may include numerous interfaces having differing addresses, having differing protocols, and/or belonging to different physical servers. Further, wake-up server 600 may share interface 610 or portions thereof with other entities such as, for example, other agent devices.

Schedule processor 620 may include hardware and/or executable instructions on a machine-readable storage medium configured to receive messages from agent devices indicating criteria for reestablishing such agent devices. Schedule processor 620 may receive such messages, extract any useful information such as, for example, criteria for reestablishment and/or device image location, and store such information in schedule storage 630 for future use.

Schedule storage 630 may be any machine-readable medium capable of storing a schedule of agent devices that should be reestablished. Accordingly, schedule storage 630 may include a machine-readable storage medium such as read-only memory (ROM), random-access memory (RAM), magnetic disk storage media, optical storage media, flash-memory devices, and/or similar storage media. The contents of schedule storage will be explained in greater detail below with respect to FIG. 7.

Results handler 640 may include hardware and/or executable instructions on a machine-readable storage medium configured to receive result messages from support servers and store such messages and/or results data in results storage 640. Results handler may be further adapted to indicate to wake-up controller 660 when new results have been received.

In various embodiments, results handler 640 may be further adapted to authenticate a received result message prior to storage in results storage 650. For example, results handler may identify a schedule entry in schedule storage 630 to which the result message applies and extract authentication information from the record. Results handler 640 may then compare the authentication information from schedule storage 630 to authentication information carried by the result message. Results handler 630 may then only store the result message and/or result data in results storage 650 if the message can be properly authenticated.

Results storage 650 may be any machine-readable medium capable of storing result messages and/or result data received from support servers. Accordingly, results storage 650 may include a machine-readable storage medium such as read-only memory (ROM), random-access memory (RAM), magnetic disk storage media, optical storage media, flash-memory devices, and/or similar storage media. In various embodiments, results storage 650 may share at least one storage device with schedule storage 630.

Wake-up controller 660 may include hardware and/or executable instructions on a machine-readable storage medium configured to determine when criteria for a scheduled agent device reestablishment has been met and to subsequently reestablish such agent device. For example, wake-up controller may periodically or upon receipt of a new result message compare wake-up criteria stored in schedule storage 630 to a current time and/or result messages actually received and stored in results storage 650. Upon determining that the criteria for a particular scheduled task has been met, wake-up controller 660 may locate a device image using the information stored in schedule storage 630 and reestablish the agent device by, either directly or by instructing another device, reallocating hardware resources to the agent device and loading the device image onto these hardware resources.

FIG. 7 illustrates an exemplary wake-up schedule 700. Wake-up schedule 700 may be a table in a database or cache such as schedule storage 630. Alternatively, wake-up schedule 700 may be a series of linked lists, an array, or a similar data structure. Thus, it should be apparent that wake-up schedule 700 is an abstraction of the underlying data; any data structure suitable for storage of this data may be used. Wake-up schedule 700 may include numerous fields such as schedule ID field 705, timeout timestamp field 710, support servers field 715, wake-up criteria field 720, and/or device image location field 725. Wake-up schedule 700 may include additional fields (not shown) for storing additional information.

Schedule ID field 705 may store a unique identifier for each schedule record. Timeout timestamp field 710 may store an indication of a time after which the agent device should be reestablished, regardless of whether any other criteria have been met. Support servers field 715 may store a list of support servers from which result messages are expected for the associated agent device. Wake-up criteria 720 may store one or more criteria, other than that stored in timeout timestamp field 710, for reestablishing the agent device. Such criteria may be defined according to any method known to those of skill in the art. Device image location field 725 may store an indication of where the device image for the agent device is currently stored.

As an example, schedule record 730 indicates that, for schedule ID 0x1578, a device image is stored at location 0x9d05816a1a and that results are expected from a support server located at IP address 81.11.51.79. Schedule record 730 further specifies that the associated agent device should be reestablished either after the time 1309780844 has passed or after result messages have been received from all support servers identified in support server field 715. Schedule records 735, 740, 745 indicate similar information. Schedule record 735, however, indicates specifically that the associated agent device should be reestablished only after results have been received from the second support server indicated in support server field 715. Schedule record 740, on the other hand, indicates that the associated agent device should be reestablished after result messages have been received from any two support servers identified in support servers field 715. Finally, schedule record 745 indicates that the associated agent device should be reestablished only once a result message has been received that indicates successful performance of the requested task. Accordingly, it should be apparent that the contents of wake-up criteria 720 may be defined in various manners. Wake-up schedule may include numerous additional schedule records 750.

Figure 8:
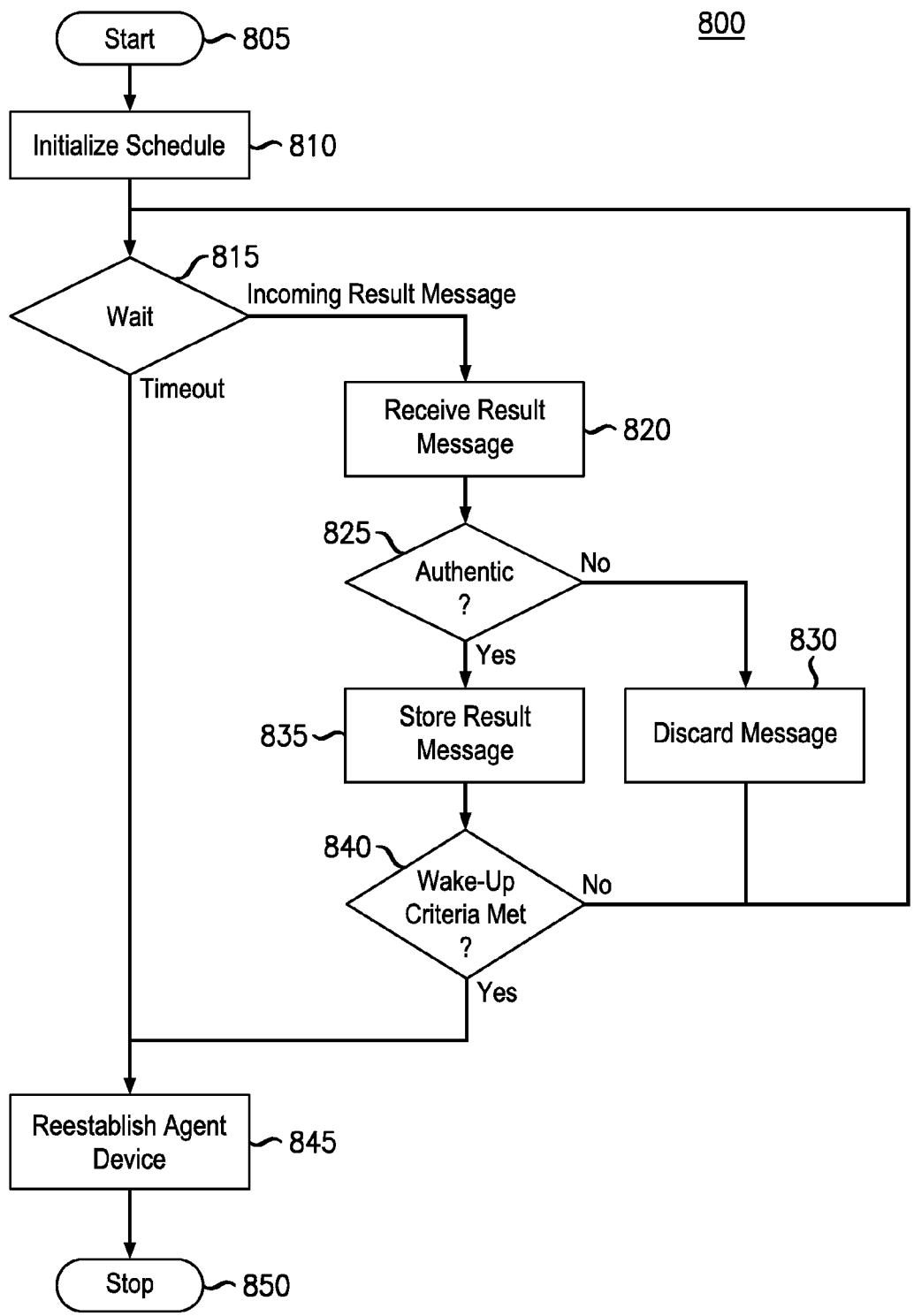
FIG. 8 illustrates an exemplary method for reestablishing an agent device.

FIG. 8 illustrates an exemplary method 800 for reestablishing an agent device. Method 800 may be performed by the components of wake-up server such as, for example, schedule processor 620, results handler 640, and/or wake-up controller 660.

Method 800 may begin in step 805 and proceed to step 810 where wake-up server 600 may initialize a schedule for reestablishing an agent device. For example, wake-up server 600 may receive a message from an agent devices indicating criteria for when the agent device should be reestablished. Wake-up server 600 may then store this information for future use as a new schedule record. Method 800 may then proceed to step 815, where wake-up server 600 waits for the occurrence of another event.

If, while waiting in step 815, the current time passes a timeout timestamp associated with the schedule record, method 800 may proceed directly to 845. If, on the other hand, a result message is sent to wake-up server 600 from a support server while waiting in step 815, method 800 may proceed to step 820. In step 820, wake-up server 600 may receive the result message. Then in step 825, wake-up server 600 may determine whether the received result message is authentic. For example, wake-up server 600 may compare authentication information stored in the schedule record to authentication information carried by the result message. If the result message is not authentic, method 800 may proceed to step 830 where wake-up server 600 may simply discard the message. Method 800 may then loop back to step 815.

If, however, wake-up server 600 determines in step 825 that the received result message is authentic, method 800 may proceed to step 835 where wake-up server 600 may store the result message for future use. Next, in step 840, wake-up server 600 may determine whether any wake-up criteria has been met. For example, wake-up server 600 may compare the result messages that have been received to the wake-up criteria specified in the schedule record. If the wake-up criteria have not yet been met, method 800 may loop back to step 815. Otherwise, the wake-up criteria has been met and method 800 may proceed to step 845.

In step 845, wake-up server 600 may reestablish the agent device. For example, wake-up server 600 may, either directly or by instructing another device, reallocate hardware resources to the agent device in accordance with characteristics of the agent device previously indicated such as, for example, in a message received in step 810. Wake-up server may also proceed to load the device image as specified by the schedule record onto these newly-allocated hardware resources. Method 800 may proceed to end in step 850.

Figures 9, 10:
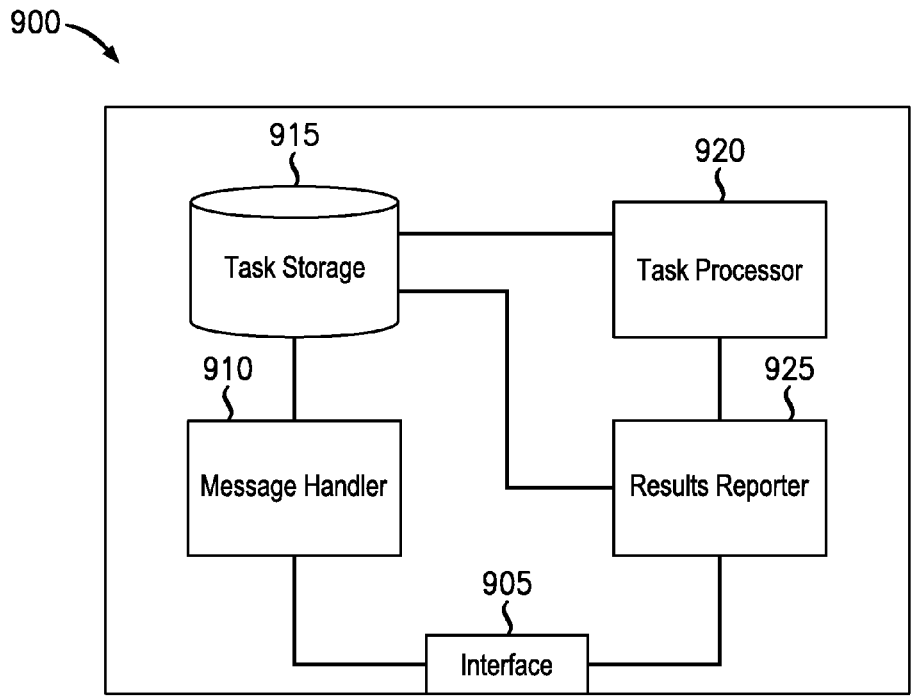
FIG. 9 illustrates an exemplary support server for processing requests from an agent device.
FIG. 10 illustrates an exemplary data arrangement for storing task information.

FIG. 9 illustrates an exemplary support server 900 for processing requests from an agent device. Support server 900 may correspond to one or more of support servers 240a-b and/or support server 340a-b. Support server may include interface 905, message handler 910, task storage 915, task processor 920, and/or results reporter 925. The components of support server 900 may share hardware components with each other and/or with other devices.

Interface 905 may be an interface comprising hardware and/or executable instructions encoded on a machine-readable storage medium configured to communicate with at least one other device. For example, interface 905 may communicate with a client device, agent device, and/or support servers. Accordingly, interface 905 may include one or more Ethernet interfaces for communication via a network such as the Internet. Further, interface 905 may include numerous interfaces having differing addresses, having differing protocols, and/or belonging to different physical servers. Further, support server 900 may share interface 905 or portions thereof with other entities.

Message handler 910 may include hardware and/or executable instructions on a machine-readable storage medium configured to receive and process various messages via interface 905. For example, message handler may receive a message from an agent device requesting the performance of some task. In response, message handler 910 may store the task in task storage 915 for future performance. Message handler 910 may also receive messages indicating that the results of a previously requested task should be directed to a different entity such as, for example, a wake-up server. Such message may include, for example, and address of the entity, an identifier known to the entity such as a schedule ID, and/or authentication information. Message handler may then update a previously stored task record to include the new information.

Task storage 915 may be any machine-readable medium capable of storing records of tasks to be performed by the support server 900. Accordingly, task storage 915 may include a machine-readable storage medium such as read-only memory (ROM), random-access memory (RAM), magnetic disk storage media, optical storage media, flash-memory devices, and/or similar storage media. The contents of task storage 915 will be explained in greater detail below with respect to FIG. 10.

Task processor 920 may include hardware and/or executable instructions on a machine-readable storage medium configured to execute various tasks as defined in task storage 915. For example, task processor may read a task record, identify the requested task, perform the task, and forward the results of this performance to results reporter 925. Such tasks may include operations such as, for example, performing a function or calculation and/or querying a database.

Results reporter 925 may include hardware and/or executable instructions on a machine-readable storage medium configured to report the resulting data of a task performance to an appropriate entity. Accordingly, results reporter may be adapted to retrieve a task record associated with a set of result data from task storage 915 and identify an appropriate recipient for the result data. Results reporter 925 may then construct a result message, which may include a portion of all of the result data, for transmission to the recipient. In various embodiments, results reporter 925 may include additional information in the result message such as, for example, a schedule ID and/or authentication information. After results reporter 925 has constructed the result message, results reporter 925 may transmit the result message to the appropriate recipient via interface 905.

FIG. 10 illustrates an exemplary data arrangement 1000 for storing task information. Data arrangement 1000 may be a table in a database or cache such as task storage 900. Alternatively, wake-up schedule 700 may be a series of linked lists, an array, or a similar data structure. Thus, it should be apparent that data arrangement 1000 is an abstraction of the underlying data; any data structure suitable for storage of this data may be used. Data arrangement 1000 may include numerous fields such as task ID field 1005, request field 1010, results recipient field 1015, and/or schedule ID field 1020. Data arrangement 1000 may include additional fields (not shown) for storing additional information such as, for example, authentication information.

Task ID field 1005 may store a unique identifier for each task to be performed. Request field 1010 may store an indication of a task that is to be performed. For example, request field 1010 may store an indication of a set of instructions to execute, the instructions themselves, and/or a database query. Results recipient field 1015 may indicate one or more recipients that should receive a result message when the task has been performed. Such field may be modified prior to completion of the task. For example, if an agent device requests that the result message be redirected to a wake-up server, the agent device may be removed from results recipient field 1015, while the wake-up device may be added. Schedule ID field 1020 may store a schedule ID, if available, corresponding to a schedule record in a wake-up server. This information may be used by such a wake-up server to correlate a result message to an agent device that is expecting the result message.

As an example, task record 1030 indicates that task 0x0A is associated with a request to query a database with a particular query string. The result of this query should be forwarded to a device located at IP v4 address 42.26.209.65. Similarly, task record 1040 indicates that task 0x32 is associated with a request to perform a particular function on a data set. The result of this task should be transmitted to the device at IP v4 address 50.32.230.130 along with the schedule ID 0x6E2. Data arrangement 1000 may include numerous additional task records 1050. While various embodiments are described herein as using IP V4 addresses, it will be apparent that the methods described herein may also be applicable to IP V6 or other forms of device addressing.

Figure 11:
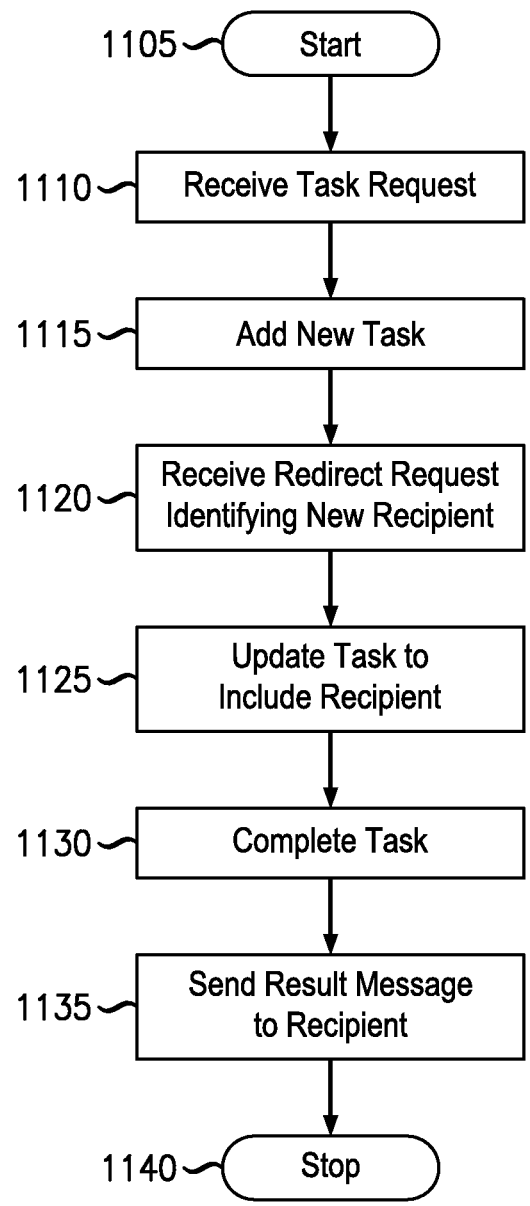
FIG. 11 illustrates an exemplary method for processing request massages.

FIG. 11 illustrates an exemplary method 1100 for processing request massages. Method 1100 may be performed by the components of support server 900 such as, for example, message handler 910, task processor 920, and/or results reporter 930.

Method 1100 may begin in step 1105 and proceed to step 1110 where support server 900 may receive a request for the performance of a task from an agent device. Method 1100 may then proceed to step 1115 where support server 900 may store the requested task for future performance. Next, in step 1120, support server 900 may receive a request from the agent device to redirect the results of the task to a new recipient such as, for example, a wake-up server. Then, in step 1125, support server 900 may update the previously stored task to include the new recipient and any other information carried by the redirect request. After some time, support server 900 may complete the requested task in step 1130. Thereafter, support server 900 may generate and transmit a result message to the recipient in step 1135. Method 1100 may then proceed to end in step 1140.

According to the foregoing, various embodiments enable an agent device to free resources for use by other devices when the agent device is otherwise idly waiting on the results of some request. In particular, by configuring a wake-up server to reestablish the agent device once such results are available, the agent device may be suspended, thereby freeing hardware resources. Further, by allowing an agent device to specify to a support sever an alternative recipient of a result message, a wake-up server may be notified as to when such results are available for the suspended agent device.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a support server for redirecting results, the method comprising:
   receiving, by the support server from an agent device, a request message;
   receiving, by the support server from the agent device, an instruction to transmit a result message associated with the request message to a wake-up server, the instruction including a set of authentication data;
   processing the request message to generate result data;
   generating a result message based on the result data, the result message including the set of authentication data; and
   transmitting the result data to the wake-up server, wherein the wake-up server compares pre-stored authentication information with the authentication data included in the result message to determine if the received result message is authentic.

2. The method of claim 1, wherein the result message includes at least a portion of the result data.

3. The method of claim 1, wherein the result message does not include all of the result data, the method further comprising transmitting at least a portion of the result data to the agent device.

4. The method of claim 1, wherein the request message includes a request for at least one of the performance of a database query and the performance of a processing task.

5. The method of claim 1, wherein at least two of the support server, the wake-up server, and the agent device include at least one processor that belongs to a cloud computing architecture.

6. The method of claim 1, further comprising:
after receiving the request, scheduling a task for future performance; and
after receiving the instruction, modifying the scheduled task to identify the wake-up server as a recipient of results.

7. A support server comprising:
a network interface; and
a processor configured to:
receive, via the network interface from an agent device, a request message;
receive, via the network interface from the agent device, an instruction to transmit a result message associated with the request message to a wake-up server, the instruction including a set of authentication data;
process the request message to generate result data;
generate a result message based on the result data, the result message including the set of authentication data; and
transmit the result data via the network interface to the wake-up server, wherein the wake-up server compares pre-stored authentication information with the authentication data included in the result message to determine if the received result message is authentic.

8. The support server of claim 7, wherein the result message includes at least a portion of the result data.

9. The support server of claim 7, wherein the result message does not include all of the result data, the processor being further configured to transmit at least a portion of the result data to the agent device.

10. The support server of claim 7, wherein the request message includes a request for at least one of the performance of a database query and the performance of a processing task.

11. The support server of claim 7, wherein at least two of the support server, the wake-up server, and the agent device include at least one processor that belongs to a cloud computing architecture.

12. The support server of claim 7, wherein the processor is further configured to:

after receiving the request, schedule a task for future performance; and
after receiving the instruction, modify the scheduled task to identify the wake-up server as a recipient of results.

13. A non-transitory machine-readable medium encoded with instructions for execution by a support server for redirecting results, the medium comprising:
instructions for receiving, by the support server from an agent device, a request message;
instructions for receiving, by the support server from the agent device, an instruction to transmit a result message associated with the request message to a wake-up server, the instruction including a set of authentication data;
instructions for processing the request message to generate result data;
instructions for generating a result message based on the result data, the result message including the set of authentication data; and
instructions for transmitting the result data to the wake-up server, wherein the wake-up server compares pre-stored authentication information with the authentication data included in the result message to determine if the received result message is authentic.

14. The non-transitory machine-readable medium of claim 13, wherein the result message includes at least a portion of the result data.

15. The non-transitory machine-readable medium of claim 13, wherein the result message does not include all of the result data, the medium further comprising instructions for transmitting at least a portion of the result data to the agent device.

16. The non-transitory machine-readable medium of claim 13, wherein the request message includes a request for at least one of the performance of a database query and the performance of a processing task.

17. The non-transitory machine-readable medium of claim 13, further comprising:
instructions for, after receiving the request, scheduling a task for future performance; and
instructions for, after receiving the instruction, modifying the scheduled task to identify the wake-up server as a recipient of results.

* * * * *